Patented Sept. 3, 1935

2,013,028

UNITED STATES PATENT OFFICE 2,013,028

INSECTICIDAL OIL

Hyym E. Buc, Roselle, N. J., assignor to Standard Oil Development Company, a corporation of Delaware No Drawing. Application March 12, 1931, Serial No. 522,179

7 Claims. (Cl. 167—24)

The present invention relates to insecticidal oils containing in solution a larger amount of rotenon or rotenoids than have heretofore been incorporated by known methods. Rotenon is the active principle of certain plants known as fish poisons, such as derris, cube, etc. The term rotenoid is used to designate insecticidal principles of the same plants which are not exactly identical with rotenon in their chemical constitution but have a similar insecticidal action.

I have discovered that all halogenated hydrocarbons containing more than about 25% of chlorine or an equivalent amount of other halogens, such as iodine, bromine, are not only good solvents in themselves for rotenons and rotenoids but also increase the solubility of such insecticidal principles in oils, while by themselves they are very insoluble in oil. The highly halogenated hydrocarbons act, therefore, as mutual solvents for the rotenon, rotenoids, and the oil.

The mutual solvent action of the highly halogenated hydrocarbons becomes a very valuable factor in the preparation of certain insecticidal oils.

Kerosene or similar naphtha fractions, either alone or containing pyrethrum extract, have for a long time been used for killing household insects, such as flies, roaches, bed bugs, etc. The killing power of such kerosene or naphtha is greatly increased by dissolving rotenon in it. Up to the present time very large amounts of the solvent were required in order to keep the rotenon and rotenoids in solution.

Rotenon in the amount of 0.02–0.2% in the kerosene is sufficient for greatly increasing its insecticidal value. It is important that this amount can be kept in solution by means of a comparatively small amount of mutual solvent. The following example will illustrate the amount that is necessary of the mutual solvents which form the subject matter of the present invention:

1 gram rotenon
20 grams halogenated naphthalene of specific gravity 1.25
1 liter kerosene The kerosene or similar naphtha fractions used in such household insecticides are relatively non-volatile. Easily volatizable petroleum oils, such as petroleum ether, are unsatisfactory for use as household insecticides due to their inflammability.

The horticultural and agricultural oil sprays are another important insecticidal oil class which are greatly improved by my invention. The advantages of my invention become especially pronounced by dissolving about 0.1% or more of rotenon or an equivalent amount of rotenoids in the oil. The oil used for such purpose is usually a viscous non-volatile oil, such as heavy gas oil or light lubricating oil but sometimes lighter oils, such as kerosene, are also used for horticultural sprays. The amount of highly chlorinated hydrocarbon which is necessary to keep the rotenon or rotenoids in solution is about 15 to 25 times the amount of rotenon or rotenoids, depending on the nature of the oil.

It is known to those skilled in the art that it is difficult to prepare an oil spray which will efficiently destroy the insect pests on the trees and at the same time be entirely safe and harmless to the tree. If the amount of oil is reduced in the horticultural spray below 1–2%, the same becomes harmless to the tree but at the same time it loses its insect killing power. By the addition of about 0.1% to .5% of rotenon or an equivalent amount of rotenoids the insecticidal value of the oil spray is so greatly increased that the control of the pests becomes efficient even at concentrations of far below 2% of oil, say 1% or less of oil in the spray. The emulsification in water may either be mechanical or by use of casein or saponin or by introduction into the oil of other emulsifying principles such as oil soluble sulfonate, triethanolamine oleate, etc.

The following examples will illustrate some of the compositions obtained by the present invention:

*Example 1*

2 grams rotenon
30 grams halogenated naphthalene (halowax oil) of specific gravity 1.25
1 liter light lubricating oil

*Example 2*

1.5 grams rotenon
25 grams of chlorinated gasoline containing 50% of chlorine
1 liter of petroleum oil having a gravity of 27° A. P. I. and a viscosity of 115 Saybolt at 100° F.

*Example 3*

An aqueous emulsion containing 0.7% of the composition given in Example 1.

The solutions of rotenon in non-volatile petroleum oils prepared with non-volatile mutual solvents, such as halogenated naphthalene and halogenated gasoline containing more than 25% of chlorine are characterized by a great stability due to the non-volatile character of the mutual solvent.

Having thus described my invention, what I claim is:

1. An insecticidal preparation comprising a relatively non-volatile petroleum oil, insecticidal material selected from the group consisting of rotenon and rotenoids and a non-volatile highly halogenated hydrocarbon with a halogen content corresponding to not less than 25% of chlorine.

2. An insecticidal composition consisting of a non-volatile viscous petroleum oil containing not less than 0.1% of insecticidal material selected from the group consisting of rotenon and rotenoids and not less than 1.5% of a non-volatile highly halogenated hydrocarbon.

3. An insecticidal composition consisting of a non-volatile viscous petroleum oil containing not less than 0.1% of insecticidal material selected from the group consisting of rotenon and rotenoids and not less than 1.5% or substantially non-volatile of halowax.

4. An insecticidal composition consisting of a non-volatile viscous petroleum oil containing not less than 0.1% of insecticidal material selected from the group consisting of rotenon and rotenoids and not less than 1.5% of highly chlorinated gasoline, the amount of chlorinated gasoline being sufficient to keep the insecticidal material dissolved in the petroleum oil.

5. An aqueous emulsion containing less than 2% of the composition according to claim 2.

6. An aqueous emulsion containing less than 2% of a composition according to claim 2.

7. An aqueous emulsion containing less than 2% of a composition according to claim 4.

HYYM E. BUC.